United States Patent Office 3,706,686
Patented Dec. 19, 1972

3,706,686
PROCESSING AID FOR POST-CHLORINATED POLYVINYL CHLORIDE
Kenneth L. Eilers, Irvington, N.Y., and Adam F. Kopacki, Westwood, N.J., assignors to Stauffer Chemical Company, New York, N.Y.
No Drawing. Filed Feb. 12, 1971, Ser. No. 115,087
Int. Cl. C08f 29/22
U.S. Cl. 260—23 XA        13 Claims

ABSTRACT OF THE DISCLOSURE

There are disclosed compositions of post-chlorinated polyvinyl chloride intimately admixed with a processing aid comprising a polyacrylate modified-polyvinyl chloride which is prepared by polymerizing an acrylate ester monomer, such as methyl methacrylate, in the presence of particles of polyvinyl chloride which have been previously prepared by means of a suspension polymerization procedure. These new compositions permit faster calendering with improved gloss and better surface qualities on extrusion as compared with post-chlorinated polyvinyl chloride which has not been modified in this manner.

BACKGROUND OF THE INVENTION

Post-chlorinated polyvinyl chloride, hereinafter referred to as "PCPVC," is a material which, as is known to those skilled in the art, differs in certain of its properties from conventional polyvinyl chloride. For example, it is non-flammable and resistant to chemical attack by acids and alkalies so that fibers spun from this resin have been found to be suitable for use as filter cloths, industrial clothing and rotproof fabrics. As a rigid structural plastic, PCPVC has been used for industrial or household hot water piping and tubing and in other applications which take advantage of its resistance to high temperature conditions.

In the course of converting PCPVC, the resin ordinarily undergoes a fluxing step after which it is processed to its desired shape. It is, of course, necessary that the resin remain stable at the high temperatures which are encountered during these processing and fluxing procedures. Additionally, the resin must yield under stress, it must have adequate flow properties and it must readily lend itself to milling, molding and extrusion. Since unmodified PCPVC does not always possess all of these properties, it has been necessary and/or desirable to add various processing aids to the resin. For instance, acrylic ester polymers in powder form are often dry-blended with the PCPVC and then milled on a calender or extruded. Typical of the commercially available acrylic ester polymers which are sold for this purpose is a 90:10 methyl methacrylate:ethyl acrylate copolymer. In addition, U.S. Pat. No. 3,488,406 describes a processing aid for PCPVC comprising a cross-linked acrylate ester copolymer, such as a crosslinked butyl acrylate copolymer, which may also be dispersed in a hard, non-tacky resinous material such as polyvinyl chloride.

Although some of these presently available acrylate ester polymer processing aids for PCPVC provide satisfactory results, their high cost often limits their use. And, insome instances, the resulting PCPVC compositions are still deficient in certain desirable characteristics.

Thus, it is the prime object of this invention to provide improved PCPVC compositions containing an efficient, low cost processing aid which substantially enhances the processing characteristics of the PCPVC. Various other objects and advantages of this invention will become apparent from the disclosure which follows hereinafter.

TECHNICAL DISCLOSURE OF THE INVENTION

It has now been found that the processing characteristics of PCPVC can be significantly improved upon its being intimately admixed with a processing aid which comprises a polyacrylate modified-polyvinyl chloride which has been prepared by polymerizing an acrylate ester monomer, preferably methyl methacrylate, in the presence of particles of a vinyl chloride polymer, preferably polyvinyl chloride, which have been previously prepared by means of a suspension polymerization procedure. More particularly, it has been found that the compositions resulting from the admixture of PCPVC with this low-cost processing aid are substantially easier to process than unmodified PCPVC as evidenced, for example, by their shortened flux times and higher shear torques when studied in a Brabender plastograph. These PCPVC compositions therefore permit more rapid calendering with improved gloss as well as better surface qualities on extrusion.

The PCPVC suitable for use in preparing the novel compositions of this invention may be prepared by means of any of the post-chlorination procedures well known to those skilled in the art. For example, as taught in U.S. Pat. No. 2,996,489, the polyvinyl chloride may be chlorinated in the presence of ultra-violet radiation while in the form of an aqueous slurry with a chlorinated hydrocarbon such as carbon tetrachloride, chlorobenzene or chloroform being present in the system as a swelling agent. The PCPVC may also be prepared by means of a procedure wherein organic compounds which, on being heated, generate free radicals are utilized in the reaction in place of ultra-violet radiation. Suitable free radical initiators are the peroxide and azo compounds such, for example, as benzoyl peroxide, lauroyl peroxide, acryl persulfonate, isopropylpercarbonate, azobisisobutyronitrile, azomethane, azobis($\alpha$,$\gamma$-dimethylvaleronitrile) and the so-called redox catalyst systems.

Although the PCPVC for use in the improved compositions of this invention is preferably prepared from polyvinyl chloride, it is also possible to prepare it from copolymers of vinyl chloride with a minor proportion, usually about 5%, by weight, of one or more vinyl comonomers, i.e. one or more ethylenically unsaturated monomers, including vinylidene halides such as vinylidene chloride, vinylidene bromide and vinylidene fluoride; alpha-olefins such as ethylene, propylene and butylene; vinyl esters of carboxylic acids such as vinyl acetate, vinyl butyrate, and vinyl stearate; the $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylic-acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl pyrrolidones such as N-vinyl-2-pyrrolidone; vinyl aryl compounds such as styrene and alpha-methyl styrene; nitriles of ethylenically unsaturated carboxylic acids such as acrylonitrile and methacrylonitrile; and, $C_1$–$C_{20}$ alkyl vinyl ethers such as methyl vinyl ether, ethyl vinyl ether and stearyl vinyl ether. Preferred for use as optional comonomers are the vinylidene halides, particularly vinylidene chloride, and the lower alkyl esters of acrylic and methacrylic acids.

The polyacrylate modified-polyvinyl chloride processing aid used in preparing the improved PCPVC compositions of this invention is itself prepared by means of a procedure in which a conventional vinyl chloride suspension polymerization is first carried out in a manner such that the reaction is halted at or near its completion. Unreacted vinyl chloride monomer is then removed whereupon a minor proportion, with respect to the vinyl chloride suspension polymer, of an acrylate ester monomer, preferably methyl methacrylate, is introduced into the system. Polymerization is then resumed and continued until the acrylate ester monomer polymerizes in and/or on the particles of the previously polymerized polyvinyl chloride. A preferred procedure for conducting this process for the preparation of these processing aids is described in co-pending application Ser. No. 43,568, filed June 4, 1970, now abandoned.

Thus, the procedure set forth in the latter disclosure broadly comprises suspension polymerizing vinyl chloride under conditions whereby polyvinyl chloride (PVC) is obtained in a certain particle size range by means of a conventional, free radical initiated, suspension polymerization at a controlled rate of agitation and in the presence of a specified concentration of a suspending agent; removing unreacted vinyl chloride from the system after polymerization is at least 60% complete; adding to the system an effective concentration of a chain transfer agent and a minor proportion, i.e. up to about 50% by total solids weight of an acrylate ester monomer comprising methyl methacrylate (MMA) and up to about 25% by its weight of one or more optional comonomers, said monomer or monomers having first been pre-mixed with a fresh supply of an effective concentration of a monomer soluble, free radical catalyst; continuing the polymerization until the thus added methyl methacrylate, and any optional comonomers added therewith, are polymerized in and/or on the particles of the previously polymerized PVC; and, separating the polyacrylate modified-polyvinyl chloride thereby obtained. Apparently, the thus added acrylate ester monomer, i.e. the methyl methacrylate and any optional comonomers, are absorbed by and polymerized in and/or on the initially prepared polyvinyl chloride particles so as to thereby produce the desired polyacrylate modified-processing aid resin which acts as an effective processing aid for blending with PCPVC.

Moreover, it has been found that the utilization, in this preferred process of:

(1) The step of completely removing any unreacted vinyl chloride monomer prior to introducing and initiating the polymerization of the MMA and (2) the step of pre-mixing the MMA, and any optional monomers, with fresh catalyst as well as (3) the use of a chain transfer agent during the polymerization of the MMA all combine to contribute towards the attainment of a polyacrylate modified-polyvinyl chloride processing air characterized by its excellent melt flow properties.

Similarly, by controlling the rate of agitation and the concentration of the suspending agent that is present in the system during the initial polymerization of the PVC as well as during the subsequent polymerization of the acrylate ester monomer, it is possible to readily control the size of the initially produced PVC particles, thereby greatly facilitating the absorption and the polymerization of the subsequently introduced MMA and any optional monomers. In the same manner, the size of the resulting polyacrylate modified-polyvinyl chloride particles is readily maintained within the required limits so as to avoid producing them in too large a particle size thereby preventing "gell" or "fish-eye" or "grain-like" surface characteristics in the final PCPVC composition wherein these processing aid particles have been included.

According to the preferred embodiment of this preparative procedure, the acrylate ester monomer, i.e. the MMA and any optional monomers, is introduced into the system in a concentration of from about 20–100%, and preferably from about 25–66%, by weight, of the previously polymerized PVC. Thus, from about 10–60%, and preferably about 20–40%, by weight, of the resulting polycrylate modified-polyvinyl chloride procesisng aid product will comprise moieties derived from the acrylate ester monomer, i.e. from the MMA and any optional monomers, while the polyvinyl chloride comprises from about 40 to 90%, and preferably about 60–80%, by weight of the total weight of this product. Thus, for use in preparing the PCPVC compositions of this invention, it is preferred to employ a processing aid containing about 30%, by weight, of polyacrylate ester polymer moieties.

It is important that the acrylate ester monomer which is employed should consist primarily of from about 80 to 100%, by weight, of methyl methacrylate (MMA) but, as a minor monomer ingredient together with the MMA, up to about 20% of the total acrylate ester monomer weight or 25% by weight of the MMA of one or more optional monomers may also be present. These optional monomers may be selected from the group consisting of the $C_2$–$C_3$ alkyl methacrylates, e.g. ethyl, n-propyl and 2-propyl methacrylate; the glycidyl esters of acrylic and methacrylic acid such as glycidyl methacrylate and glycidyl acrylate; the $C_1$–$C_{12}$ alkyl acrylates wherein the alkyl group may be straight or branched; or, mixtures of any two or more of the latter optional monomers. Especially preferred are mixtures of 80–100%, by weight of methyl methacrylate with 20–0% of ethyl methacrylate, ethyl acrylate, and/or glycidyl methacrylate.

In greater detail, now, the preferred process for the preparation of these processing aids comprises adding the appropriate amount of acrylate ester monomer, comprising methyl methacrylate with or without, one or more optional comonomers, to a previously polymerized, aqueous suspension of polyvinyl chloride, particularly PVC obtained by means of a suspension polymerization process. In conducting such a suspension polymerization process for the preparation of PVC, the vinyl chloride monomer, or a mixture of vinyl chloride with a minor proportion of an appropriate comonomer such as vinyl acetate or a lower alkyl acrylate, is admixed with a concentration of from about 0.01 to 5.0%, as based on the weight of the total monomer mixture, of a suspending agent such, for example, as methyl cellulose, hydroxyethyl cellulose, hydroxypropyl cellulose, carboxymethyl cellulose, talc, clay, polyvinyl alcohol, gelatine and the like.

In addition, a monomer soluble, free radical catalyst or initiator such, for example as 2,2'-azobisisobutyronitrile, lauroyl peroxide, benzoyl peroxide, or isopropylperoxy dicarbonate should be present in the system in a concentration of from about 0.01 to 3%, by weight, of the total monomer charge being utilized for the polymerization of the PVC or vinyl chloride copolymer. Polymerization may then be initiated by heating the above described recipe at a temperature in the range of from about 20 to 90° C. and for a period of from about 3 to 15 hours with agitation being applied throughout the course of the reaction.

The size of these initially prepared PVC particles is a critical feature of this preparative process. The reason is not entirely understood, but apparently the acrylate ester monomer, i.e. methyl methacrylate and any optional monomers, is somehow improperly absorbed by PVC particles which are substantially larger than a maximum of about 150 microns and it cannot, therefore, be effectively polymerized. A minimum particle size of about 5 microns is desirable for these particles.

Similarly, it is necessary that the particles size of the final product, i.e. of the polyacrylate modified-polyvinyl chloride processing aid, be within certain limits. Thus, it is necessary that they should range in size from a minimum of about 10 microns up to a maximum limit such that no more than about 15%, by weight, are larger than about 150 microns. A preferred range is from about 40 to 150 microns. In order to be able to attain this desired particle size in these processing aids, it is necessary to utilize the step of premixing the acrylate ester monomer, i.e. the MMA and any optional comonomers, with the fresh catalyst prior to adding either of the latter ingredients to the previously prepared PVC.

Polymerization of the subsequently added acrylate ester monomer is initiated by a standard, monomer soluble, i.e. oil-soluble, free radical initiating catalyst. Suitable catalysts include, 2,2′-azobisisobutyronitrile, lauroyl peroxide, benzoyl peroxide, t-butyl peroxy pivalate and isopropylperoxy dicarbonate. As has already been noted, one of the novel aspects of this preparative process relates to the fact that it is essential to pre-mix the additional free radical catalyst with the MMA, or with the MMA and any optional comonomers which are being utilized, prior to introducing either the catalyst or the MMA into the system in order to be able to attain a final product in which the MMA moieties have undergone the proper degree of conversion, i.e. in order to attain MMA moieties having the desired molecular weight range, so as to result in the preparation of polyacrylate-modified PVC processing aids having suitable melt flow characteristics. Thus, if the catalyst is not premixed with the MMA monomer, the previously prepared PVC particles will tend to absorb MMA and the catalyst in a non-uniform manner.

Chain transfer agents are used during the polymerization of the MMA, and any optional monomers, in order to further control the melt flow properties of the resulting polyacrylate modified-PVC processing aids. These chain transfer agents can be elected from the group consisting of chlorinated aliphatic hydrocarbons, aromatic hydrocarbons, aliphatic and cyclic ketones, cyclic ethers, alkyl esters of aliphatic carboxylic acids, aliphatic alcohols, aliphatic carboxylic acids, cyclic hydrocarbons and, preferably, mono-, di- and polymercaptans with optimum results being obtained with low molecular weight polymercaptans having from 3 to 5 mercaptan groups per molecule such, for example, as pentaerythritol tetrathioglycolate.

With respect to the amount of chain transfer agent which is used in this preparative process, this will largely be determined by the particular chain transfer agent that is selected. However, in most instances they may be utilized in a concentration of from about 0.025–7.5%, as based on the total weight of the acrylate ester monomer charge, i.e. on the total weight of the MMA and any of the above identified optional monomers present in the monomer system.

The polymerization of the acrylate ester monomer, i.e. of the MMA and of any optional comonomers which may have been introduced into the system therewith, is conducted by heating the system, i.e. the selected chain transfer agent, the previously prepared PVC host polymer and the mixture of the catalyst with the MMA and any optional comonomers, at a temperature of from about 40 to 100° C. for a time sufficient to completely polymerize the MMA, and any optional comonomers, in and/or on the host PVC particles. It is to be pointed out that it is not ordinarily necessary to introduce any fresh suspending agent into the system since a sufficient quantity will already be present from the initial polymerization of the PVC.

The particular catalyst, temperature, reaction time and other operating conditions chosen are, of course, interdependent and may be those ordinarily employed in the polymerization of MMA. Other variations in polymerization technique will suggest themselves to those skilled in the art.

The process of preparing these processing aids is particularly satisfactory when conducted with a vinyl chloride host polymer. However, as has already been briefly noted, there can also be employed the usual copolymers of vinyl chloride with minor proportions of vinyl acetate and other ethylenically unsaturated monomer such as the lower, i.e. the $C_1$–$C_{12}$, alkyl acrylates provided that the resulting vinyl chloride copolymers are within the above specified particle size ranges.

It is essential, in this process, that the PVC, or vinyl chloride copolymer, be first polymerized by the suspension technique until the reaction is at least 60% complete and preferably 80% or more complete. Unreacted vinyl chloride must then be removed when the system is vented before the MMA and any optional comonomers are subsequently added and polymerized. If this is not done, the remaining vinyl chloride monomer will undergo an undesirable copolymerization with the subsequently added MMA leading to non-reproducible results and to the preparation of a soft, rubbery product which often hardens before it can be removed from the reactor. This feature of sequential polymerization, i.e. of first polymerizing the vinyl chloride and then the MMA, is a unique and important aspect of this process. Additional details relating to the preparation of these polyacrylate modified-polyvinyl chloride processing aids may be obtained from a reading of the above noted copending application.

With respect to proportions, the novel compositions of this invention, comprising PCPVC which has been intimately admixed with the above described polyacrylate modified-polyvinyl chloride processing aid may contain from about 3 to 18 parts, by weight, of the processing aid per 100 parts, by weight, of the PCPVC. The precise concentration of the processing aid which is utilized will depend, primarily, upon the degree of hardness and other physical properties which are sought as well as other technical and economic considerations known and understood by those skilled in the art. For most applications, however, optimum results appear to be attainable with compositions containing about 5 parts of the processing aid per 100 parts of the PCPVC.

The actual preparation of these PCPVC compositions may be accomplished by means of any convenient procedure which will result in an intimate admixture of the processing aid within the mass of the PCPVC substrate. Thus, for example, an aqueous suspension containing particles of the processing aid may simply be blended or otherwise admixed with the PCPVC substrate which should, preferably, be in the form of an aqueous latex or suspension. Or, if desired, the processing aid and the PCPVC may be admixed while each is in the form of a solid powder.

The novel compositions of this invention can be prepared so as to contain various optional additives which may include plasticizers such as the alkyl esters of phthalic, adipic and sebacic acids such, for example, as dioctyl phthalate and ditridecyl phthalate and aryl phosphate esters such, for example, as diphenyl, 2-ethylhexyl and tricresyl phosphate, etc.; lubricants and mold release agents such as stearic acid or its metal salts, petroleum based waxes, mineral oils, polyethylene waxes, etc.; and heat and light stabilizers including heat stabilizers such as barium, cadmium, calcium and zinc soaps or phenates, basic lead compounds, organo-tin compounds such as dialkyl tin mercaptides and dialkyl tin maleates, thiolauric anhydride and n-butyl stannoic acid, epoxidized oils, alkyl diphenyl phosphites and triaryl phosphites and light stabilizers such as the phenyl salicylates, benzophenones and benzotriazoles, etc. For a more complete listing of plasticizers, lubricants, stabilizers and other functional additives, one may consult "Polyvinyl Chloride" by H. A. Sarvetnick published by Van Nostrant Reinhold Co., New York, N.Y., in 1969.

These polyblends may also contain fillers, pigments, such as titanium dioxide, dyes, opacifying agents, decorative additives such as reflective metal foils or flakes, and other imbedded solid objects such as fiber glass, textile fibers, asbestos, paper, and the like provided that they do not detract from the desired processing characteristics of these products. In addition, the compositions may contain flame retardants such as antimony compounds, chlorinated paraffins, perchlorinated alicyclic compounds, bromine containing organic compounds, halogenated alkyl phosphates or phosphonates, alkyl acid phosphates, or small concentrations of phosphoric acid.

Thus, typical PCPVC formulations suitable for commerical utilization can contain, as based upon 100 parts, by weight, of PCPVC, from about 0.5–3.0 parts of a lubricant, from about 2–10 parts of a pigment, from about 2–5 parts of a stabilizer, and from about 3–18 parts of one of the above defined processing aids.

The novel PCPVC compositions of this invention, comprising blends of PCPVC with the above described polyacrylate modified-polyvinyl chloride processing aid, may be utilized in any of the coating, laminating, adhesive, impregnating and especially in the molding applications known to those skilled in the art. For example, these compositions may be used for preparing such diverse items as calendered films, blow molded bottles, extruded and blown films, extruded and shaped articles such as panels, tubes, pipes, sheets, rods and fibers and in carrying out such processes as injection molding, fluidized bed coating, electrostatic powder spraying and rotational coating, etc. These compositions may be coated upon and/or absorbed by all types of substrates. For example, they may be used as coatings, impregnants, fillers, laminants, and adhesives for such substrates as wood; paper; metals; textiles based on either natural or synthetic fibers or blends thereof; synthetic polymer films such as those based upon polyolefins; regenerated cellulose, i.e. cellophane, polyvinyl chloride, polyesters and the like; leather; natural and synthetic rubber; fiberboard; and, synthetic plastics prepared by means of either addition or condensation polymerization techniques.

The following examples are given to illustrate this invention but not in any way to limit its scope. In these examples, all parts given are by weight unless otherwise noted.

EXAMPLE I

This example illustrates the preparation of a typical polyacrylate modified-polyvinyl chloride processing aid applicable for use in preparing the novel PCPVC compositions of this invention.

Part 1

A 20 gallon Pflaudler reactor is charged with a standard recipe, as given below, for preparing suspension grade polyvinyl chloride. The polymerization is conducted at 60° C. for 5½ hours, with agitation being applied at a rate of about 300 r.p.m., resulting in the preparation of PVC particles having an average particle size of about 25–50 microns:

| | Parts |
|---|---|
| Vinyl chloride | 221 |
| Water | 234 |
| Methyl cellulose (1% aqueous solution) | 50 |
| 2,2'-azobisisobutyronitrile (catalyst) | 0.144 |

Part 2

When the reaction of Part 1, hereinabove, is essentially complete (80–85% conversion) all of the excess vinyl chloride monomer is vented off whereupon 0.09 part lauryl mercaptan chain transfer agent followed by 90 parts of methyl methacrylate which has first been premixed with 0.063 part of additional, 2,2'-azobisisobutyronitrile catalyst are added. Under agitation at a rate of 300 r.p.m., the polymerization is allowed to proceed at 75° C. until the MMA is polymerized in and/or on the host PVC particles (about 5 hours). The resulting product, which contains 70% of PVC and 30% of PMMA, has a Relative Viscosity of 2.00 as determined with a 1% solution of the polymer in cyclohexanone at 25° C. The particle size of this polyacrylate modified-PVC processing aid is such that no more than about 10.1%, by weight, is larger than about 150 microns.

EXAMPLE II

This example illustrates the preparation of a PCPVC composition typical of the products of this invention.

This composition contains the following ingredients:

| | Parts |
|---|---|
| PCPVC | 100 |
| Titanium dioxide | 5 |
| Calcium stearate (lubricant) | 2 |
| An organo-tin mercaptide stabilizer sold as "Thermolite 31" by M & T Chemicals | 3 |
| The 70:30 PVC:PMMA processing aid whose preparation is described in Example 1 | 10 |

In preparing this composition, the PCPVC is first introduced into a high speed mixer whereupon the stabilizer is added. Upon achieving a homogeneous blend, the processing aid, lubricant, and pigment are, each, in turn, introduced following the homogeneous incorporation of the previously added ingredient into the formulation.

The resulting composition is then easily milled upon a two-roll mill in which the front roll is at a temperature of 355° F. and the back roll is at a temperature of 360° F. In contrast to these excellent processing characteristics, an identically prepared composition which did not, however, contain the processing aid is found to readily degrade when an attempt is made to mill it on the above described mill.

Variations may be made in proportions, procedures and materials without departing from the scope of this invention as defined in the following claims.

What is claimed is:

1. A polymer composition having improved processing characteristics, said composition comprising an intimate admixture of post-chlorinated polyvinyl chloride with a plurality of particles of a polyacrylate modified-polyvinyl chloride processing aid, said processing aid comprising particles of polyvinyl chloride having polyacrylate ester moieties polymerized in and/or on particles said polyacrylate ester moieties of said processing aid consisting essentially of from about 80 to 100%, by weight, of polymethyl methacrylate together with from about 20 to 0%, by weight, of one or more optional methyl methacrylate copolymer moieties; said polyacrylate ester moieties being present in said processing aid in a concentration of from about 10–60%, by weight, of the polyvinyl chloride particles of said processing aid; wherein said optional methyl methacrylate copolymer moieties are selected from the group consisting of copolymers of methyl methacrylate with the $C_2$–$C_3$ alkyl methacrylates, copolymers of methyl methacrylate with the $C_1$–$C_{12}$ alkyl acrylates, copolymers of methyl methacrylate with the glycidyl esters of acrylic and methacrylic acid and mixtures of the latter copolymers; said processing aid particles being prepared by means of a process which comprises: (1) first preparing particles of polyvinyl chloride by suspension polymerizing vinyl chloride monomer in the presence of from about 0.01 to 5%, by weight, of the vinyl chloride monomer, of a suspending agent with agitation being applied to the system; (2) removing unreacted vinyl chloride monomer from the system after polymerization of the vinyl chloride is at least about 60% complete; (3) adding to the suspension of polyvinyl chloride particles resulting from step (1) an effective concentration of a chain transfer agent and a solution of (a) an acrylate ester monomer consisting essentially of from about 80 to 100%, by weight, of methyl methacrylate together with from about 20 to 0%, by weight, of one or more optional monomers, and (b) an effective concentration of at least one free radical initiating catalyst which is soluble in said acrylate ester monomer; said solution of acrylate ester monomer and catalyst having been pre-mixed prior to its addition to said suspension of polyvinyl chloride; said acrylate ester monomer being added to the system in a total amount to provide between about 20–100% of monomer, by weight, of the polyvinyl chloride resulting from step (1); (4) suspension polymerizing the acrylate ester monomer in the presence of the mixture resulting from step (3) while applying agitation; and (5) recovering the particles of polyacrylate-modified polyvinyl chloride resulting from step (4).

2. The polyacrylate modified-polyvinyl chloride processing aid of claim 1, wherein the polyacrylate ester moieties of said processing aid consist solely of polymethyl methacrylate.

3. The polyacrylate modified-polyvinyl chloride processing aid of claim 1, wherein said processing aid contains 30%, by weight, of polymethyl methacrylate and 70%, by weight, of polyvinyl chloride.

4. The composition of claim 1, wherein said polyacrylate modified-polyvinyl chloride processing aid is present in said composition in a concentration of from about 3–18 parts per 100 parts of said post-chlorinated polyvinyl chloride.

5. The composition of claim 4, wherein said polyacrylate modified-polyvinyl chloride processing aid is present in said composition in a concentration of about 5 parts per 100 parts of said post-chlorinated polyvinyl chloride.

6. The composition of claim 1, wherein the particles of said polyacrylate modified-polyvinyl chloride processing aid have a particle size in the range of from about 10 microns up to a maximum limit such that no more than about 15%, by weight, are larger than about 150 microns.

7. The composition of claim 6, wherein the particles of said polyacrylate modified-polyvinyl chloride processing aid have a particle size in the range of from about 40 to 150 microns.

8. The composition of claim 1, wherein a lubricant is also intimately admixed therein.

9. The composition of claim 8, wherein said lubricant is calcium stearate.

10. The composition of claim 1, wherein a pigment is also intimately admixed therein.

11. The composition of claim 10, wherein said pigment is titanium dioxide.

12. The composition of claim 1, wherein a heat stabilizer is also intimately admixed therein.

13. The composition of claim 12, wherein said heat stabilizer is an organo-tin mercaptide.

References Cited

UNITED STATES PATENTS

| 2,746,944 | 5/1956 | Naps et al. | 260—884 |
| 3,504,053 | 3/1970 | Williams | 260—884 |
| 3,657,382 | 4/1972 | Kopecki | 260—876 X |
| 3,167,598 | 1/1965 | Heaps et al. | 260—876 |
| 3,488,406 | 1/1970 | Sehm | 260—876 X |

FOREIGN PATENTS

| 1,015,334 | 12/1965 | Great Britain | 260—884 |

DONALD E. CZAJA, Primary Examiner

D. J. BARRACK, Assistant Examiner

U.S. Cl. X.R.

260—41 C, 45.75 K, 876 R, 884, 899